(12) United States Patent
Mao et al.

(10) Patent No.: US 6,456,467 B1
(45) Date of Patent: Sep. 24, 2002

(54) LAMINATED SHIELDS WITH ANTIPARALLEL MAGNETIZATIONS

(75) Inventors: Sining Mao, Savage; Nurul Amin, St. Paul, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 45 days.

(21) Appl. No.: 09/723,056

(22) Filed: Nov. 27, 2000

Related U.S. Application Data

(60) Provisional application No. 60/193,715, filed on Mar. 31, 2000.

(51) Int. Cl.$^7$ ............................. G11B 5/127; G11B 5/33
(52) U.S. Cl. ....................................................... 360/319
(58) Field of Search ................................ 360/319, 313, 360/110, 126, 125, 317

(56) References Cited

U.S. PATENT DOCUMENTS

| | | | | |
|---|---|---|---|---|
| 4,103,315 A | 7/1978 | Hempstead et al. | ........ | 360/110 |
| 5,208,715 A | 5/1993 | Mowry | ........ | 360/319 |
| 5,447,781 A | 9/1995 | Kano et al. | ........ | 428/212 |
| 5,515,221 A | 5/1996 | Gill et al. | ........ | 360/319 |
| 5,621,592 A | 4/1997 | Gill et al. | ........ | 360/319 |
| 5,687,044 A | 11/1997 | Saito | ........ | 360/319 |
| 5,761,011 A | * 6/1998 | Miyauchi et al. | ........ | 360/319 |
| 5,805,392 A | * 9/1998 | Mallary et al. | ........ | 360/126 |
| 5,838,521 A | 11/1998 | Ravipati | ........ | 360/319 |
| 5,872,691 A | * 2/1999 | Fukuyama et al. | ........ | 360/319 |
| 6,018,443 A | 1/2000 | Watanabe et al. | ........ | 360/319 |
| 6,292,334 B1 | * 9/2001 | Koike et al. | ........ | 360/319 |

OTHER PUBLICATIONS

"Magnetization and Switching Characteristics of Composite Thin Magnet Films" by E. Goto et al., *Journal of Applied Physics*, pp. 10–15, vol. 36, No. 9, Sep. 1965.

"Interactions in Multilayer Magnetic Films" by A. Yelon, *Physics of Thin Films*, vol. 6, Ch. 4, pp. 205–300, 1971.

"Micromagnetics of Laminated Permalloy Films" by J. C. Slonczewski et al, *IEE Transactions on Magnetics*, vol. 24, No. 3, pp. 2045–2054, May 1998.

"Study of Exchange Anisotropy in NiFe/NiMn and NiFe/IrMn Exchange Coupled Films" by T. Pokhil et al, *Journal of Applied Physics*, pp. 4916–4918, vol. 85, No. 8, Apr. 15, 1999.

"Performance of Metallic Antiferromagnetics for Use in Spin–Valve Read Sensors" by M. Lederman, *IEEE Transactions on Magnetics*, pp. 794–799, vol. 35, No. 2, Mar. 1999.

\* cited by examiner

*Primary Examiner*—Robert S. Tupper
*Assistant Examiner*—Julie Anne Watko
(74) *Attorney, Agent, or Firm*—Kinney & Lange, P.A.

(57) ABSTRACT

A thin film structure suitable for use as a shield for a read element of a transducing head has an first ferromagnetic layer, a second ferromagnetic layer and a first decoupling layer. The first decoupling layer is positioned between the first ferromagnetic layer and the second ferromagnetic layer. An easy axis of the first ferromagnetic layer is substantially parallel to an easy axis of the second ferromagnetic layer. The first decoupling layer causes a magnetization of the first ferromagnetic layer to be substantially antiparallel to a magnetization of the second ferromagnetic layer.

20 Claims, 6 Drawing Sheets

LAMINATED SHIELDS WITH ANTIPARALLEL MAGNETIZATIONS

CROSS-REFERENCE TO RELATED APPLICATION(S)

This application claims the priority from provisional U.S. patent application 60/193,715, filed on Mar. 31, 2000 for "Laminated Shields With Antiparallel Magnetizations For GMR Head" of Sining Mao and Nural Amin.

BACKGROUND OF THE INVENTION

The present invention relates generally to the field of electronic data storage and retrieval systems. In particular, the present invention relates to a novel lamination of materials for use as a shield of a magnetoresistive element of a transducing head.

In an electronic data storage and retrieval system, a transducing head typically includes a reader portion having a magnetoresistive (MR) sensor for retrieving magnetically-encoded information stored on a magnetic disc. MR sensors fall generally into two broad categories: (1) anisotropic magnetoresistive (AMR) sensors and (2) giant magnetoresistive (GMR) sensors. AMR sensors generally having a single MR layer formed of a ferromagnetic material. The resistance of the MR layer varies as a function of $\cos^2\alpha$, where a is the angle formed between the magnetization vector of the MR layer and the direction of the sense current flowing in the MR layer.

GMR sensors have a series of alternating magnetic and nonmagnetic layers. The resistance of GMR sensors varies as a function of the spin-dependent transmission of the conduction electrons between the magnetic layers separated by the nonmagnetic layer and the accompanying spin-dependent scattering which takes place at the interface of the magnetic and nonmagnetic layers and within the magnetic layers.

GMR sensors using two layers of ferromagnetic material separated by a layer of nonmagnetic electrically-conductive material are generally referred to as spin valve (SV) sensors. The layers of a SV sensor include a nonmagnetic spacer layer positioned between a ferromagnetic pinned layer and a ferromagnetic free layer. A magnetization of the pinned layer is fixed in a predetermined direction, typically normal to an air bearing surface (ABS) of the SV sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

GMR sensors using two layers of ferromagnetic material separated by a layer of nonmagnetic electrically-insulating material are generally referred to as spin-dependent tunnel junction (STJ) sensors. The layers within a STJ sensor include an ultra-thin tunnel barrier layer positioned between a ferromagnetic pinned layer and a ferromagnetic free layer. As in the SV sensor, a magnetization of the pinned layer is fixed in a predetermined direction, typically normal to an air bearing surface of the STJ sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary.

A response curve of the MR sensor compares the voltage across the MR sensor to the magnetic flux received from the disc by the sensor. This response curve has both linear and non-linear portions, of which it is preferred that the MR sensor operate along the linear portions. To force the MR sensor to operate along the linear portions, the sensor is magnetically biased at a biasing point that is located along the linear portion of the response curve.

During a read operation, the top and bottom shields ensure that the MR sensor reads only the information stored directly beneath it on a specific track of the magnetic medium or disc by absorbing any stray magnetic fields emanating from adjacent tracks and transitions.

Within a typical shield exists a plurality of magnetic domains separated from each other by a plurality of magnetic domain walls. Each domain has a magnetization that is oriented in a direction different than the magnetization of all adjacent domains. The application of an external magnetic field, either during manufacture or from an adjacent track or transition of the magnetic storage medium during operation, to the shield can cause the magnetization of each of the domains within that shield to rotate, thereby causing the domains to move. Because of the random nature of the domain wall location, the domain walls generally do not return to their original location after the external magnetic field is removed.

The shields exert stray magnetic fields on the MR sensor. These stray fields are accounted for when the MR sensor is biased. As the domain walls move, however, these stray magnetic fields change, thus changing the bias point of the MR sensor, as well as the response of the MR sensor to signals emanating from the rotating disc. The overall result is noise during the read operation.

This noise due to movement of domain walls is particularly acute in bottom shields for GMR sensors. The processing of a GMR sensor, either a SV or a STJ sensor, typically requires the magnetic annealing of an antiferromagnetic layer to pin the magnetization of its pinned layer. This magnetic anneal is performed while the bottom shield is present and can cause a realignment of the bottom shield anisotropy, giving rise to a highly undesirable domain configuration.

A reduction of domain wall density from magnetic shields can be achieved by use of a lamination consisting of alternating ferromagnetic and nonmagnetic spacer films. In such shields, a coupling will occur between the ferromagnetic layers, providing an alternate flux closure path that minimizes domain wall formation. Others have proposed that hard bias or antiferromagnetic layers can be used to bias the shields of MR sensors, thus resulting in a controlled domain structure within the shield.

BRIEF SUMMARY OF THE INVENTION

The present invention introduces a novel thin film structure suitable for use as a shield for a read element of a transducing head. The thin film structure of the present invention has an first ferromagnetic layer, a second ferromagnetic layer and a first decoupling layer. The first decoupling layer is positioned between the first ferromagnetic layer and the second ferromagnetic layer. An easy axis of the first ferromagnetic layer is substantially parallel to an easy axis of the second ferromagnetic layer. The first decoupling layer causes a magnetization of the first ferromagnetic layer to be substantially antiparallel to a magnetization of the second ferromagnetic layer.

A first alternate embodiment of the present invention includes a plurality of thin film structures as described above and a plurality of spacer layers interspersed between each of the plurality of thin film structures. In this first alternate embodiment, pairs of ferromagnetic layers on opposite sides of each of the plurality of spacer layers are substantially antiparallel magnetizations.

A second alternate embodiment of the present invention includes a third ferromagnetic layer and a fourth ferromagnetic layer. The third ferromagnetic layer is positioned between the first ferromagnetic layer and the first decoupling layer, and has a magnetization substantially parallel to the magnetization of the first ferromagnetic layer. The fourth ferromagnetic layer is positioned between the second ferromagnetic layer and the first decoupling layer, and has a magnetization substantially parallel to the magnetization of the second ferromagnetic layer.

A third alternate embodiment of the present invention includes a plurality of thin film structures in accord with the second alternate embodiment of the present invention and a plurality of spacer layers interspersed between each of the plurality of thin film structures. In this third alternate embodiment, pairs of ferromagnetic layers on opposite sides of each of the plurality of spacer layers are substantially antiparallel magnetizations.

A fourth alternate embodiment of the present invention includes a plurality of ferromagnetic layers and a plurality of decoupling layers interspersed between each of the plurality of ferromagnetic layers. In this fourth alternate embodiment, magnetization directions of each of the plurality of ferromagnetic layers is alternated such that two adjacent ferromagnetic layers will have antiparallel magnetizations.

The thin film structures of the present invention are particularly useful as shields for a read element of a transducing head having a bottom shield, a bottom gap layer positioned on the bottom shield, a read element positioned on the bottom gap layer, a top gap layer positioned on the read element and a top shield positioned on the top gap layer.

DETAILED DESCRIPTION

Figure 1:
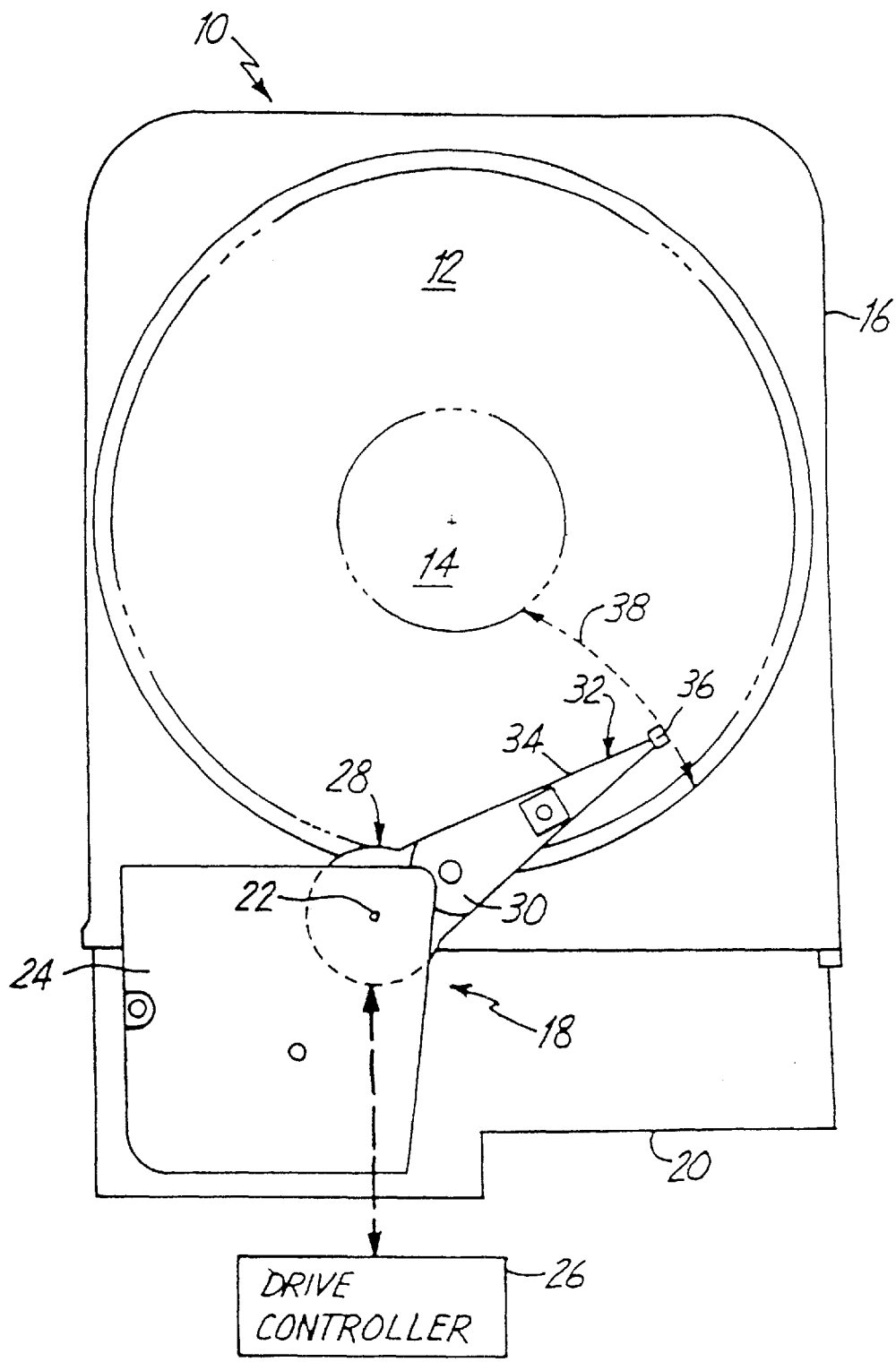
FIG. 1 is a top view of a disc drive system including a magnetoresistive read head in accord with the present invention.

FIG. 1 is a top view of disc drive system 10 including a magnetoresistive (MR) read head in accord with the present invention. Disc drive system 10 includes magnetic disc 12 mounted for rotational movement about an axis defined by spindle 14 within housing 16. Disc drive 10 also includes actuator 18 mounted to base plate 20 of housing 16 and pivotally movable relative to disc 14 about axis 22. Cover 24 covers a portion of actuator 18. Drive controller 26 is coupled to actuator 18. Drive controller 26 is either mountable within disc drive system 10 or is located outside of disc drive system 10 with suitable connection to actuator 18. Actuator 18 includes actuator arm assembly 28, a rigid support member 30, and head gimbal assembly 32. Head gimbal assembly 32 includes flexure arm 34 couple to rigid member 30 and air bearing slider 36 couple to flexure arm 34 by a gimbal. Slider 36 supports a magnetoresistive transducer or head for reading information from disc 12 and encoding information to disc 12.

During operation, drive controller 26 receives position information indicating a portion of disc 12 to be accessed. Drive controller 26 receives the position information from either an operator, a host computer, or from another suitable controller. Based on the position information, drive controller 26 provides a position signal to actuator 18. The position signal causes actuator 18 to pivot about axis 22. This causes slider 36 to move radially over the surface of disc 12 in a generally arc-like path indicated by arrow 38. Drive controller 26 and actuator 18 operate in a known closed loop, negative feedback manner so that the transducer carried by slider 36 is positioned over the desired portion of disc 12. Once the transducer is appropriately positioned, drive controller 26 then executes a desired read or write operation.

Figure 2:
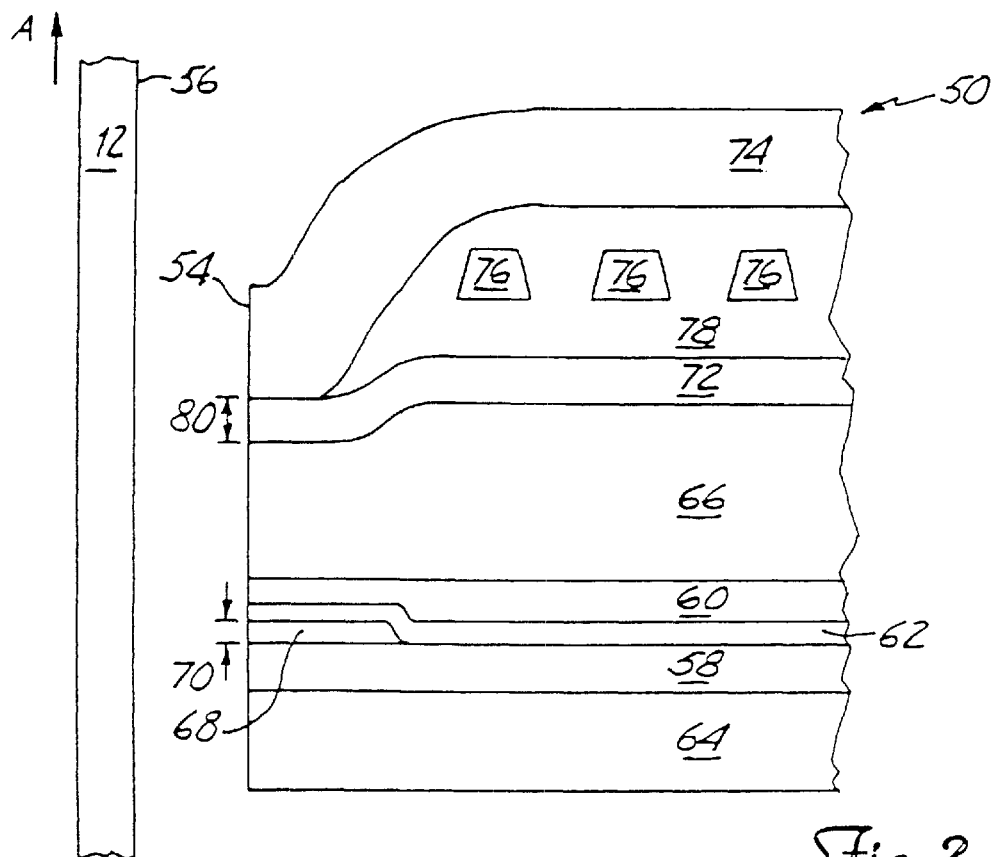
FIG. 2 is a cross-sectional view of a magnetic transducing head and a magnetic disc taken along a plane normal to an air bearing surface of the transducing head.

FIG. 2 is a cross-sectional view of magnetic transducing head 50 and magnetic disc 12 taken along a plane normal to air bearing surface 54 of read/write head 50. FIG. 2 illustrates magnetic transducing head 50 and its placement relative to magnetic disc 12. Air bearing surface 54 of magnetic transducing head 50 faces disc surface 56 of magnetic disc 12. Magnetic disc 12 travels or rotates in a direction relative to magnetic transducing head 50 as indicated by arrow A. The spacing between air bearing surface 54 and disc surface 56 is preferably minimized while avoiding contact between magnetic transducing head 50 and magnetic disc 12. In most cases, contact between magnetic transducing head 50 and magnetic disc 12 would destroy both magnetic transducing head 50 and magnetic disc 12.

A reader portion of transducing head 50 includes bottom gap layer 58, top gap layer 60, metal contact layer 62, bottom shield 64, top shield/bottom pole 66, and read element 68. Read gap 70 is defined on air bearing surface 54 between terminating ends of bottom gap layer 58 and metal contact layer 62. Metal contact layer 62 is positioned between bottom gap layer 58 and top gap layer 60. Read element 68 is positioned between terminating ends of bottom gap layer 58 and metal contact layer 62.

A writer portion of magnetic transducing head 50 includes top shield/bottom pole 66, write gap layer 72, top pole 74, conductive coil 76, and polymer layer 78. Write gap 80 is defined on air bearing surface 54 by write gap layer 72 between terminating ends of top pole 74 and top shield/bottom pole 66. Electrically conductive coils 76 are provided to generate magnetic fields across write gap 80 and are positioned in polymer layer 78 between top pole 74 and write gap layer 72. While FIG. 2 shows a single layer of conductive coils 76, it is understood in the art that several layers of conductive coils may be used separated by several polymer layers. Transducing head 50 is a merged MR head in which top shield/bottom pole 66 is employed both as a top shield in the reader portion and as a bottom pole in the writer portion. If read/write head 50 were a piggyback MR head, top shield/bottom pole 66 would be formed of separate layers.

Figure 3:
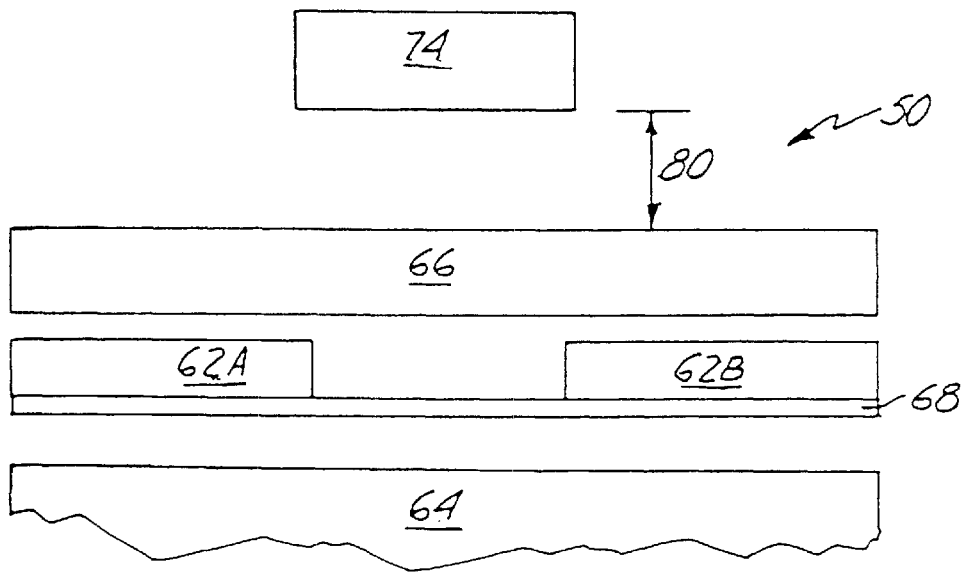
FIG. 3 is a layered diagram illustrating magnetically significant elements of the magnetic transducing head of FIG. 2.

FIG. 3 is a layered diagram of magnetic transducing head 50. FIG. 3 illustrates the location of a plurality of magnetically significant elements of magnetic transducing head 50 as they appear along air bearing surface 54 of magnetic read/write head 50 shown in FIG. 2. In FIG. 3, all spacing and insulating layers are omitted for clarity. Bottom shield 64 and top shield/bottom pole 66 are spaced to provide for a location of read element 68. Read element 68 has two passive regions defined as the portions of read element 68 positioned adjacent to metal contacts 62A and 62B. An active region of read element 68 is defined as the portion of read element 68 located between the two passive regions of read element 68. The active region of read element 68 defines a read sensor width.

Read element 68 is preferably a MR element or a giant magnetoresistive (GMR) stack. A MR element is generally formed of a ferromagnetic material whose resistance fluctuates in response to an external magnetic field, preferably from a magnetic medium or disc. GMR sensors have a series of alternating magnetic and nonmagnetic layers. The resistance of a GMR sensor varies as a function of the spin-dependent transmission of the conduction electrons between the magnetic layers separated by the nonmagnetic layer and the accompanying spin-dependent scattering which takes place at the interface of the magnetic and nonmagnetic layers and within the magnetic layers.

GMR sensors using two layers of ferromagnetic material separated by a layer of nonmagnetic electrically-conductive material are generally referred to as spin valve (SV) sensors. The layers of a SV sensor include a nonmagnetic spacer layer positioned between a ferromagnetic pinned layer and a ferromagnetic free layer. A magnetization of the pinned layer is fixed in a predetermined direction, typically normal to an air bearing surface (ABS) of the SV sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

GMR sensors using two layers of ferromagnetic material separated by a layer of nonmagnetic electrically-insulating material are generally referred to as spin-dependent tunnel junction (STJ) sensors. The layers within a STJ sensor include an ultra-thin tunnel barrier layer positioned between a ferromagnetic pinned layer and a ferromagnetic free layer. As in the SV sensor, a magnetization of the pinned layer is fixed in a predetermined direction, typically normal to an air bearing surface of the STJ sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary.

During a read operation, shields 64 and 66 ensure that read element 68 reads only the information stored directly beneath it on a specific track of magnetic disc 12 by absorbing any stray magnetic fields emanating from adjacent tracks and transitions.

Within a typical shield exists a plurality of magnetic domains separated from each other by a plurality of magnetic domain walls. Each domain has a magnetization that is oriented in a direction different than the magnetization of all adjacent domains. The application of an external magnetic field, either during manufacture or from an adjacent track or transition of the magnetic storage medium during operation, to bottom shield 64 can cause the magnetization of each of the domains within shield 64 to rotate, thereby causing the domains to move. Because of the random nature of the domain wall location, the domain walls generally do not return to their original location after the external magnetic field is removed.

Shields 64 and 66 exert stray magnetic fields on real element 68. These stray fields are accounted for when read element 68 is biased. As the domain walls move, however, these stray magnetic fields change, thus changing the bias point of read element 68, as well as the response of read element 68 to signals emanating from rotating disc 12. The overall result is noise during the read operation.

This noise due to movement of domain walls is particularly acute in bottom shield 64 when read element 68 is a GMR sensor. The processing of a GMR sensor, either a SV or a STJ sensor, typically requires the magnetic annealing of an antiferromagnetic layer to pin the magnetization of its pinned layer. This magnetic anneal is performed while bottom shield 64 is present and can cause a realignment of the anisotropy of bottom shield 64, giving rise to a highly undesirable domain configuration.

A reduction of domain wall density from magnetic shields 64 and 66 can be achieved by use of a lamination consisting of alternating ferromagnetic and nonmagnetic spacer films. In such shields, a coupling will occur between the ferromagnetic layers, providing an alternate flux closure path that minimizes domain wall formation. Others have proposed that hard bias or antiferromagnetic layers can be used to bias shields 64 and 66 of read element 68, thus resulting in a controlled domain structure within the shields.

The present invention is a novel lamination of materials for use as a magnetic shield. The novel lamination of materials causes a reduction in domain wall density in the magnetic shield, thereby resulting in a more stable magnetic shield.

Figure 4:
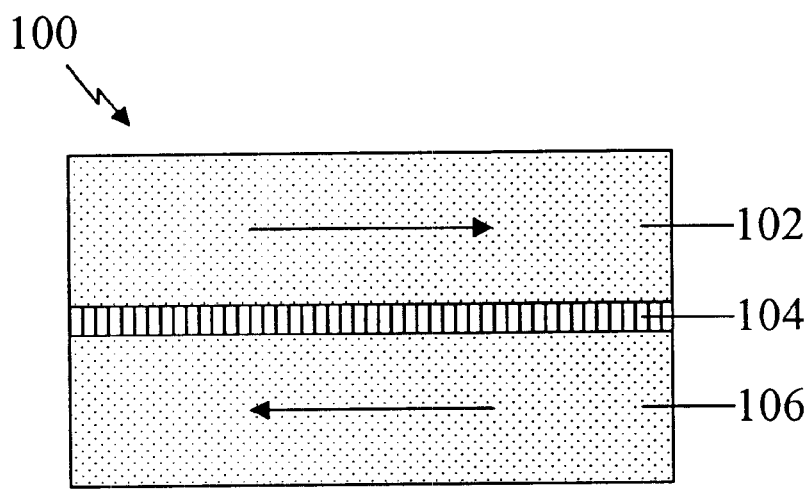
FIG. 4–FIG. 9 are layer diagrams of shields formed of novel laminations of materials in accord with the present invention.

FIG. 4 is a layer diagram of shield 100 formed of a novel lamination of material in accord with the present invention. Shield 100 is formed of first ferromagnetic layer 102, decoupling layer 104 and second ferromagnetic layer 106.

Each of first ferromagnetic layer 102 and second ferromagnetic layer 106 is preferably formed of a soft ferromagnetic material having anisotropic properties, such as nickel iron, cobalt iron, a cobalt amorphous alloy, FeN, permalloy or sendust. In a preferred embodiment, an easy axis of first ferromagnetic layer 102 is preferably parallel to an easy axis of second ferromagnetic layer 106.

Decoupling layer 104 is positioned between first ferromagnetic layer 102 and second ferromagnetic layer 106. Decoupling layer 104 is preferably formed of a material such as ruthenium. In a preferred embodiment, decoupling layer 104 has a thickness in a range from about 6.5 Å to about 10.5 Å. Through a quantum mechanics interaction (known as a Rudermann-Kittel-Kasuya-Yoshida (RKKY) interaction) between decoupling layer 104 and each of first and second ferromagnetic layers 102 and 106, magnetizations of first ferromagnetic layer 102 and second ferromagnetic layer 106 will be antiparallel to one another. The RKKY interaction operates between ferromagnetic layers 102 and 106 via conduction electrons in decoupling layer 104, resulting in opposing ferromagnetic layers 102 and 106 being antiferromagnetically coupled together to produce anti-parallel spin states that give rise to spin-dependent scattering.

Figure 5:
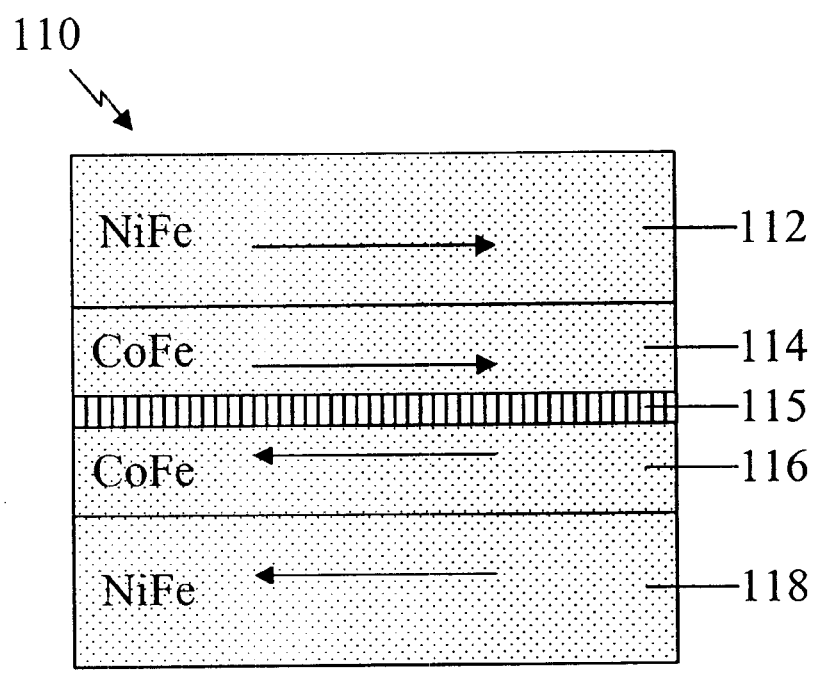

FIG. 5 is a layer diagram of shield 110 formed of a novel lamination of materials in accord with the present invention. Shield 110 is formed of first ferromagnetic layer 112, second ferromagnetic layer 114, decoupling layer 115, third ferromagnetic layer 116 and fourth ferromagnetic layer 118. Each of first ferromagnetic layer 112, second ferromagnetic layer 114, third ferromagnetic layer 116 and fourth ferromagnetic layer 118 is preferably formed of a soft ferromagnetic material having anisotropic properties, such as nickel iron, cobalt iron, a cobalt amorphous alloy, FeN, permalloy or sendust. An easy axis of first ferromagnetic layer 112 is preferably parallel to easy axes of each of second ferromagnetic layer 114, third ferromagnetic layer 116 and fourth ferromagnetic layer 118. In a preferred embodiment, first ferromagnetic layer 114 and third ferromagnetic layer 116 are each formed of a cobalt iron alloy, and first ferromagnetic layer 112 and fourth ferromagnetic layer 118 are preferably formed of a nickel iron alloy.

Decoupling layer 115 is preferably formed of a material such as ruthenium. Decoupling layer 115 is positioned between second ferromagnetic layer 114 and third ferromagnetic layer 116. First ferromagnetic layer 112 is positioned adjacent second ferromagnetic layer 114, such that second ferromagnetic layer 114 is positioned between first ferromagnetic layer 112 and decoupling layer 115. Fourth ferromagnetic layer 118 is positioned adjacent third ferromagnetic layer 116, such that third ferromagnetic layer 116 is positioned between decoupling layer 115 and fourth ferromagnetic layer 118. A thickness of decoupling layer 115 is preferably in the range of about 6.5 Å to about 10.5 Å. Through a quantum mechanics interaction (known as a Rudermann-Kittel-Kasuya-Yoshida (RKKY) interaction) between decoupling layer 115 and each of second and third ferromagnetic layers 114 and 116, magnetizations of second ferromagnetic layer 114 and third ferromagnetic layer 116 will be antiparallel to one another. The RKKY interaction operates between ferromagnetic layer 114 and 116 via conduction electrons in decoupling layer 115, resulting in opposing ferromagnetic layers 114 and 116 being antiferromagnetically coupled together to produce anti-parallel spin states that give rise to spin-dependent scattering. First ferromagnetic layer 112 has a magnetization parallel to second ferromagnetic layer 114, while fourth ferromagnetic layer 118 has a magnetization parallel to third ferromagnetic layer 116.

Figure 6:
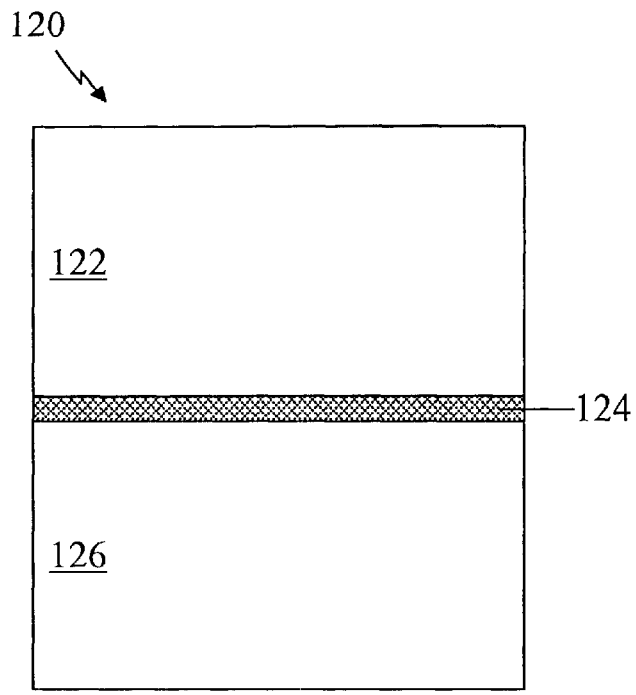
Figure 7:
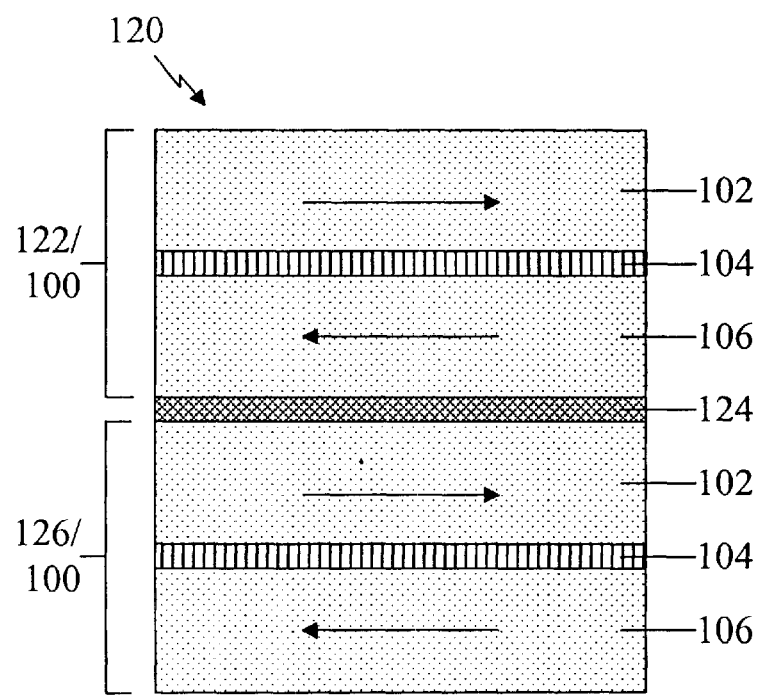
Figure 8:
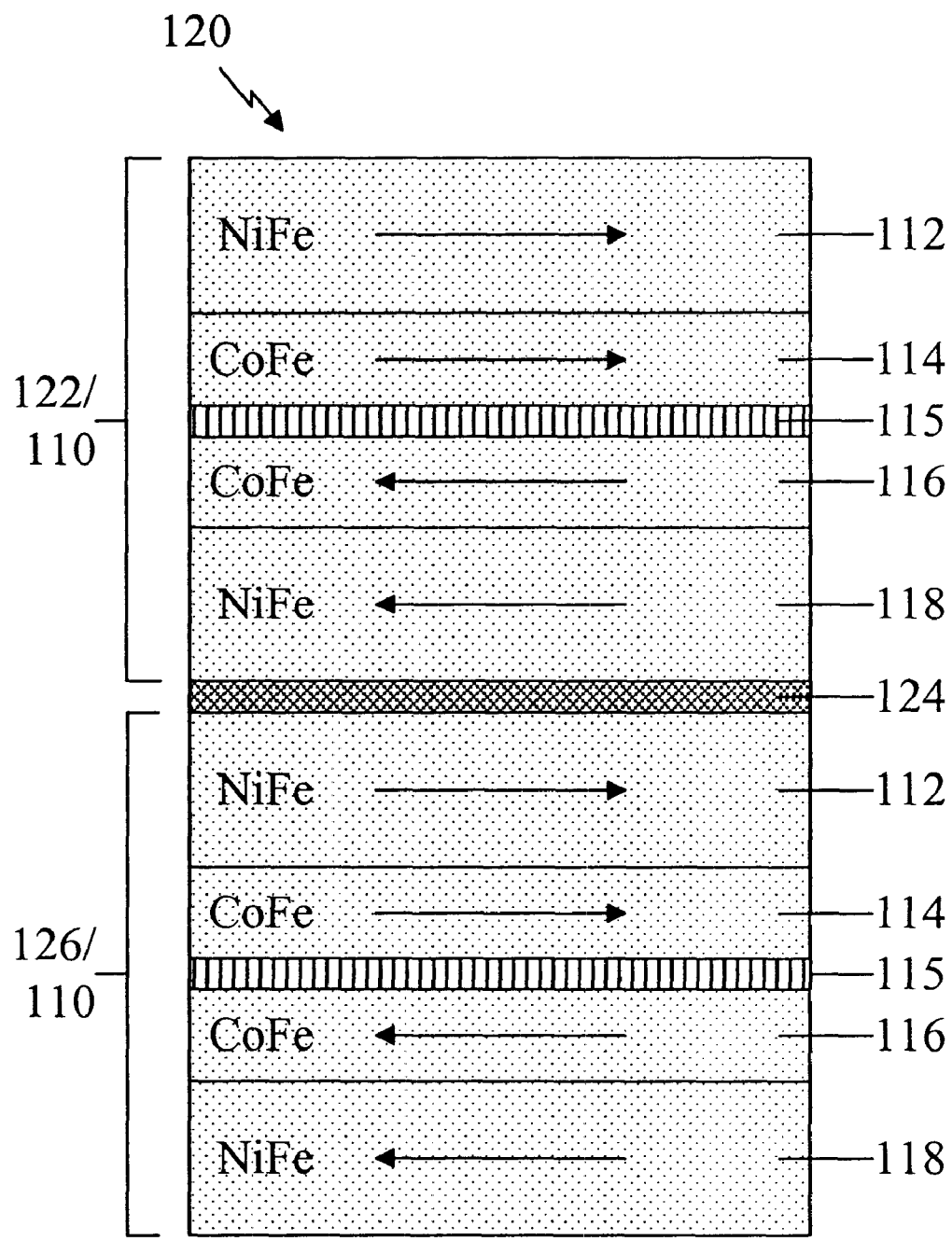

FIG. 6 is a layer diagram of shield 120 formed of a novel lamination of materials in accord with the present invention. Shield 120 is formed of first structure 122, spacer layer 124 and second structure 126. Spacer layer 124 is positioned between first structure 122 and second structure 126. Each of first and second structures 122 and 126 is preferably formed of a structure similar to that of either shield 100 or shield 110. FIGS. 7 and 8 are each examples of structure 120 of FIG. 6. As shown in FIG. 7, each of first and second structures 122 and 126 of shield 120 has been formed of a structure similar to that of shield 100. In the example of FIG. 8, each of first and second structures 122 and 126 of shield 120 has been formed of a structure similar to that of shield 110.

When combining two structures to form shield 120, it is important to alternate the direction of magnetizations of adjacent ferromagnetic layers. As shown in FIG. 7, a magnetization of first ferromagnetic layer 102 of first structure 122 is antiparallel to a magnetization of second ferromagnetic layer 106 of first structure 122 and is parallel to a magnetization of first ferromagnetic layer 102 of second structure 126. Similarly, a magnetization of second ferromagnetic layer 106 of second structure 126 is antiparallel to a magnetization of first ferromagnetic layer 102 of second structure 126 and is parallel to a magnetization of second ferromagnetic layer 106 of first structure 122.

Similarly in embodiment shown in FIG. 8, directions of magnetizations of pairs of ferromagnetic layers are alternated between decoupling layers and spacer layers. Thus, magnetizations of first and second ferromagnetic layers 112 and 114 of first structure 122 are antiparallel to magnetizations of third and fourth ferromagnetic layers 116 and 118 of first structure 122 and are parallel to magnetizations of first and second ferromagnetic layers 112 and 114 of second structure 126. Similarly, magnetizations of third and fourth ferromagnetic layers 116 and 118 of second structure 126 are antiparallel to magnetizations of first and second ferromagnetic layers 112 and 114 of second structure 126 and are parallel to magnetizations of third and fourth ferromagnetic layers 116 and 118 of first structure 122.

To build an even thicker shield, additional structures, separated by spacer layers, can be added to shield 120 of FIG. 6. As with the two structure embodiment of FIG. 6, the plurality of structures must be arranged to alternate magnetization directions in the ferromagnetic layers which are separated by either a decoupling layer or a spacer layer.

Figure 9:
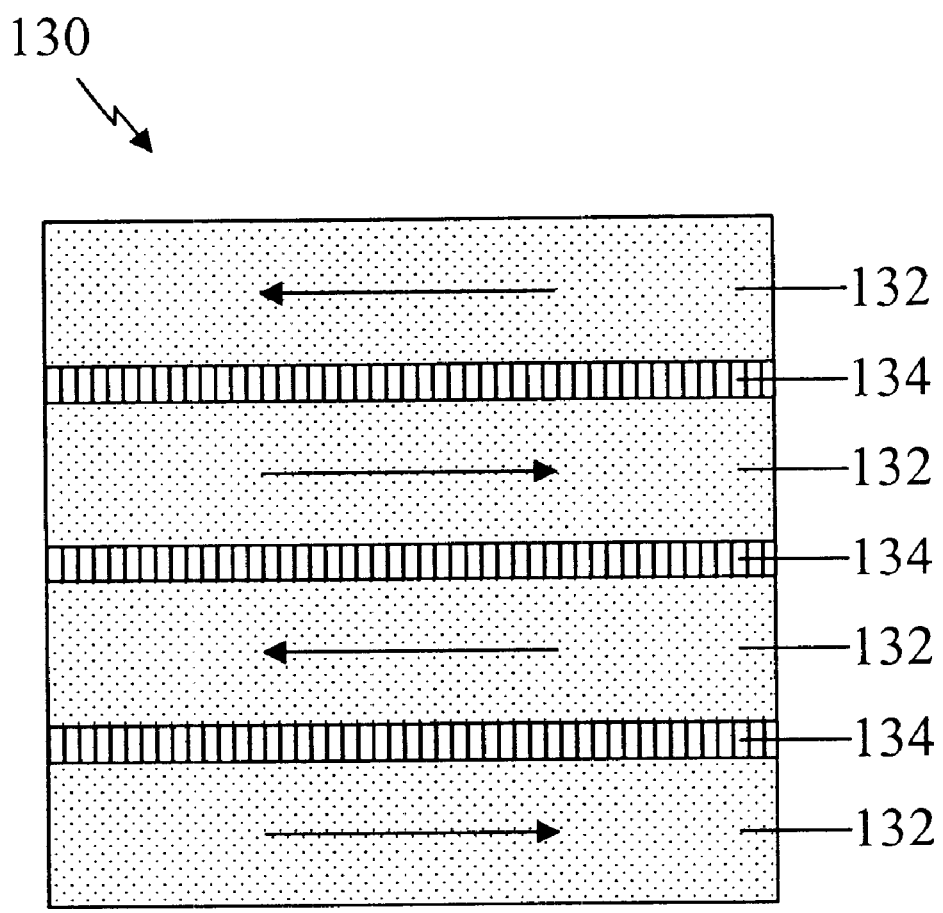

FIG. 9 is a layer diagram of shield 130 formed of a novel lamination of materials in accord with the present invention. Shield 130 is formed of a plurality of ferromagnetic layers 132 and a plurality of decoupling layers 134 interspersed between each of the plurality of ferromagnetic layers 132.

Each of the plurality of ferromagnetic layers 132 is preferably formed of a soft ferromagnetic material having anisotropic properties, such as nickel iron, cobalt iron, a cobalt amorphous alloy, FeN, permalloy or sendust. In a preferred embodiment, an easy axis of each of the plurality of ferromagnetic layers 132 are each parallel to each other.

Each of the plurality of decoupling layers 134 is preferably formed of a material such as ruthenium. In a preferred embodiment, a thickness of each of each of the plurality of decoupling layers 134 is in a range of about 6.5 Å to about 10.5 Å. Through a quantum mechanics interaction (known as a Rudermann-Kittel-Kasuya-Yoshida (RKKY) interaction) between each of the plurality of decoupling layers 104 and its adjacent two ferromagnetic layers 102, magnetizations of the two adjacent ferromagnetic layers will be antiparallel to one another. The RKKY interaction operates between the ferromagnetic layers via conduction electrons in the decoupling layer, resulting in opposing ferromagnetic layers being antiferromagnetically coupled together to produce anti-parallel spin states that give rise to spin-dependent scattering.

Although shown in FIG. 9 as having only four ferromagnetic layers 132, shield 130 may be formed of any number of ferromagnetic layers.

In summary, the present invention introduces a novel lamination of materials for use as a magnetic shield. In its most basic form, a shield in accord with the present invention is formed of two ferromagnetic layers separated by a decoupling layer. The decoupling layer causes directions of magnetizations of the two ferromagnetic layers to be oriented antiparallel to one another, thereby reducing an overall demagnetization field within the shield. The novel lamination of materials of the present invention causes a reduction in domain wall density in the magnetic shield, thereby resulting in a more stable magnetic shield.

Although the present invention has been described with reference to preferred embodiments, workers skilled in the art will recognize that changes may be made in form and detail without departing from the spirit and scope of the invention.

What is claimed is:

1. A transducing head comprising:
    a top shield, a bottom shield and a magnetoresistive sensor positioned between the top and bottom shields;
    wherein at least one of the top shield and the bottom shield comprises:
        at least two ferromagnetic layers, each of the at least two ferromagnetic layers having an easy axis substantially parallel to an easy axis of each of the remaining ferromagnetic layers; and
        at least one decoupling layer, each of the at least one decoupling layer being formed of ruthenium and being positioned between two of the at least two ferromagnetic layers, thereby causing magnetizations of the two ferromagnetic layers on either side of the decoupling layer to be substantially antiparallel to each other.

2. The transducing head of claim 1 wherein a thickness of each of the at least one decoupling layers is in the range of about 6.5 Angstroms to about 10.5 Angstroms.

3. The transducing head of claim 1 wherein each of the at least two ferromagnetic layers is formed of a nickel-iron alloy.

4. A shield for a read element of a transducing head, the shield comprising:
    a first ferromagnetic layer;
    a second ferromagnetic layer having an easy axis substantially parallel to an easy axis of the first ferromagnetic layer; and
    a first decoupling layer positioned between the first ferromagnetic layer and the second ferromagnetic layer, the first decoupling layer causing a magnetization of the first ferromagnetic layer to be substantially antiparallel to a magnetization of the second ferromagnetic layer, wherein the first decoupling layer is formed of ruthenium.

5. The shield of claim 4 wherein a thickness of the first decoupling layer is in the range of about 6.5 Angstroms to about 10.5 Angstroms.

6. The shield of claim 4 wherein each of the first and second ferromagnetic layers is formed of a nickel-iron alloy.

7. A conjoint shield comprising at least two of the shields of claim 4 and at least one spacer layer, each of the at least two shields being separated by one of the at least one spacer layer, wherein ferromagnetic layers positioned adjacent to and on opposite sides of a spacer layer have substantially antiparallel magnetizations.

8. The shield of claim 4 and also comprising:
    a third ferromagnetic layer having an easy axis substantially parallel to the easy axis of the first ferromagnetic layer; and
    a second decoupling layer positioned between the third ferromagnetic layer and the second ferromagnetic layer, the second decoupling layer causing a magnetization of the third ferromagnetic layer to be substantially antiparallel to the magnetization of the second ferromagnetic layer.

9. The shield of claim 4 wherein a thickness of the first decoupling layer is in the range of about 6.5 Angstroms to about 10.5 Angstroms.

10. A shield for a read element of a transducing head, the shield comprising:
    a first ferromagnetic layer;
    a second ferromagnetic layer having an easy axis substantially parallel to an easy axis of the first ferromagnetic layer, wherein each of the first and second ferromagnetic layers is formed of a cobalt-iron alloy; and
    a first decoupling layer positioned between the first ferromagnetic layer and the second ferromagnetic layer, the first decoupling layer causing a magnetization of the first ferromagnetic layer to be substantially antiparallel to a magnetization of the second ferromagnetic layer.

11. A shield for a read element of a transducing head, the shield comprising:
    a first ferromagnetic layer;
    a second ferromagnetic layer having an easy axis substantially parallel to an easy axis of the first ferromagnetic layer;
    a first decoupling layer positioned between the first ferromagnetic layer and the second ferromagnetic layer, the first decoupling layer causing a magnetization of the first ferromagnetic layer to be substantially antiparallel to a magnetization of the second ferromagnetic layer;
    a third ferromagnetic layer positioned between the first ferromagnetic layer and the first decoupling layer, the third ferromagnetic having a magnetization substantially parallel to the magnetization of the first ferromagnetic layer; and
    a fourth ferromagnetic layer positioned between the second ferromagnetic layer and the first decoupling layer, the fourth ferromagnetic having a magnetization substantially parallel to the magnetization of the second ferromagnetic layer.

12. The shield of claim 11 wherein the first decoupling layer is formed of ruthenium, each of the first and second ferromagnetic layers is formed of a nickel-iron alloy and each of the third and fourth ferromagnetic layers is formed of a cobalt-iron alloy.

13. A conjoint shield comprising at least two of the shields of claim 11 and at least one spacer layer, each of the at least two shields being separated by one of the at least one spacer layer, wherein ferromagnetic layers positioned adjacent to and on opposite sides of a spacer layer have substantially antiparallel magnetizations.

14. The shield of claim 11 wherein a thickness of the first decoupling layer is in the range of about 6.5 Angstroms to about 10.5 Angstroms.

15. In a transducing head comprising:
    a bottom shield;
    a top shield;
    a bottom gap layer positioned between the bottom shield and the top shield;
    a top gap layer positioned between the bottom gap layer and the top shield; and
    a read element positioned between the bottom gap layer and the top gap layer;
    an improvement comprising at least one of the bottom and top shields being comprised of:

at least two ferromagnetic layers, each of the at least two ferromagnetic layers having an easy axis substantially parallel to an easy axis of each of the remaining ferromagnetic layers; and at least one decoupling layer, each of the at least one decoupling layer being positioned between two of the at least two ferromagnetic layers, the at least one decoupling layer thereby causing magnetizations of the two ferromagnetic layers on either side of the decoupling layer to be substantially antiparallel to each other, wherein each of the at least one decoupling layer is formed of ruthenium.

16. The transducing head of claim 15 wherein each of the at least one decoupling layer has a thickness in the range of about 6.5 Angstroms to about 10.5 Angstroms.

17. The transducing head of claim 15 wherein each of the at least two ferromagnetic layers is formed of a nickel-iron alloy.

18. In a transducing head comprising:

a bottom shield;

a top shield;

a bottom gap layer positioned between the bottom shield and the top shield;

a top gap layer positioned between the bottom gap layer and the top shield; and a read element positioned between the bottom gap layer and the top gap layer;

an improvement comprising at least one of the bottom and top shields being comprised of:

at least two ferromagnetic layers, each of the at least two ferromagnetic layers having an easy axis substantially parallel to an easy axis of each of the remaining ferromagnetic layers, wherein each of the at least two ferromagnetic layers is formed of a cobalt-iron alloy; and at least one decoupling layer, each of the at least one decoupling layer being positioned between two of the at least two ferromagnetic layers, the at least one decoupling layer thereby causing magnetizations of the two ferromagnetic layers on either side of the decoupling layer to be substantially antiparallel to each other.

19. In a transducing head comprising:

a bottom shield;

a top shield;

a bottom gap layer positioned between the bottom shield and the top shield;

a top gap layer positioned between the bottom gap layer and the top shield; and a read element positioned between the bottom gap layer and the top gap layer;

an improvement comprising at least one of the bottom and top shields being comprised of:

a first ferromagnetic layer;

a second ferromagnetic layer having an easy axis substantially parallel to an easy axis of the first ferromagnetic layer;

a first decoupling layer positioned between the first and the second ferromagnetic layers, the first decoupling layer causing a magnetization of the first ferromagnetic layer to be substantially antiparallel to a magnetization of the second ferromagnetic layer;

a third ferromagnetic layer positioned between first ferromagnetic layer and the first decoupling layer, the third ferromagnetic layer having a magnetization substantially parallel to a magnetization of the first ferromagnetic layer; and a fourth ferromagnetic layer positioned between the second ferromagnetic layer and the first decoupling layer, the fourth ferromagnetic layer having a magnetization substantially parallel to a magnetization of the second ferromagnetic layer.

20. The transducing head of claim 19 wherein the first decoupling layer is formed of ruthenium, each of the first and second ferromagnetic layers is formed of a nickel-iron alloy and each of the third and fourth ferromagnetic layers is formed of a cobalt-iron alloy.

* * * * *

UNITED STATES PATENT AND TRADEMARK OFFICE
CERTIFICATE OF CORRECTION

PATENT NO.    : 6,456,467 B1                                         Page 1 of 1
DATED         : September 24, 2002
INVENTOR(S)   : Sining Mao et al.

It is certified that error appears in the above-identified patent and that said Letters Patent is hereby corrected as shown below:

<u>Column 1,</u>
Line 25, delete "a is", insert -- α --

Signed and Sealed this

Twenty-second Day of July, 2003

JAMES E. ROGAN
*Director of the United States Patent and Trademark Office*